United States Patent
Cerf et al.

(12)

(10) Patent No.: US 6,642,306 B1
(45) Date of Patent: Nov. 4, 2003

(54) METHOD FOR PREPARING STABLE (CO) POLYMERS DISPERSIONS IN A POLYOL

(75) Inventors: Martine Cerf, Levallos-Perret (FR); Mieczyslaw Wnuk, Sainte Marguerite en Ouche (FR)

(73) Assignee: Atofina (FR)

( * ) Notice: Subject to any disclaimer, the term of this patent is extended or adjusted under 35 U.S.C. 154(b) by 0 days.

(21) Appl. No.: 10/088,861

(22) PCT Filed: Aug. 30, 2000

(86) PCT No.: PCT/FR00/02401

§ 371 (c)(1),
(2), (4) Date: Aug. 15, 2002

(87) PCT Pub. No.: WO01/21665

PCT Pub. Date: Mar. 29, 2001

(30) Foreign Application Priority Data

Sep. 22, 1999 (FR) .............................. 99 11834

(51) Int. Cl.$^7$ .............................. C08F 29/08; C08F 4/04
(52) U.S. Cl. .................. 524/762; 524/760; 525/25; 525/42; 525/43; 525/168; 525/538; 526/79; 526/86; 526/219
(58) Field of Search ................. 524/760, 766, 524/762; 525/25, 42, 43, 404, 538; 526/219, 79, 86

(56) References Cited

U.S. PATENT DOCUMENTS

| | | | |
|---|---|---|---|
| 1,922,451 A | 8/1933 | Osgood | |
| 2,471,959 A | * 5/1949 | Hunt | ............ 526/219 |
| 3,190,927 A | 6/1965 | Patton et al. | |
| 3,275,606 A | 9/1966 | Kujawa et al. | |
| 3,280,077 A | 10/1966 | Case et al. | |
| 3,346,557 A | 10/1967 | Patton et al. | |
| 3,585,185 A | 6/1971 | Levis et al. | |
| 3,639,541 A | 2/1972 | Austin et al. | |
| 3,639,542 A | 2/1972 | Pizzini et al. | |
| 3,652,659 A | 3/1972 | Kruger et al. | |
| 3,875,258 A | 4/1975 | Patton, Jr. et al. | |
| RE28,715 E | 2/1976 | Stamberger | |
| 3,950,317 A | * 4/1976 | Patton, Jr. et al. | ...... 106/316 X |
| RE29,014 E | 10/1976 | Pizzini et al. | |
| 4,258,148 A | 3/1981 | Chandalia et al. | |

FOREIGN PATENT DOCUMENTS

| | | |
|---|---|---|
| DE | 2254472 | 5/1974 |
| EP | 0 001 789 A | 5/1979 |
| EP | 0 080 275 | 6/1983 |
| EP | 0 230 586 | 8/1987 |
| FR | 2 384 801 A | 10/1978 |
| GB | 1410359 | 10/1975 |

OTHER PUBLICATIONS

Derwent extract [GB1410359][DE2254472].

* cited by examiner

*Primary Examiner*—Fred Teskin
(74) *Attorney, Agent, or Firm*—Hunton & Williams LLP

(57) ABSTRACT

The invention concerns a method for preparing stable (co) polymer dispersions in a polyol by polymerising in situ a monomer or a mixture of ethylenically unsaturated monomers, in the presence of one or several azocarboxylic acid ester(s).

9 Claims, No Drawings

METHOD FOR PREPARING STABLE (CO) POLYMERS DISPERSIONS IN A POLYOL

BACKGROUND OF THE INVENTION (i) Field of the Invention

This application claims benefit to International Application No. PCT/FR00/02401 (corresponding to publication number WO 01/21665), filed Mar. 29, 2001, which claims benefit of priority from French Application No. 99.11834, filed Sep. 22, 1999. The present invention relates to a process for preparing low-viscosity stable dispersions, that are free of toxic initiator residue, of (co)polymers in a polyol. More particularly, the invention relates to the in situ polymerization of an ethylenically unsaturated monomer or mixture of monomers in a polyol, in the presence of a particular azo initiator.

(ii) Description of Related Art

Dispersions of grafted copolymers prepared by the in situ polymerization of an ethylenically unsaturated monomer or mixture of monomers in a polyol in the presence of a free-radical initiator are known, as emerges from patents U.S. Pat. No. 3,652,659, U.S. Pat. No. 3,875,258 and U.S. Pat. No. 3,950,317. Among the various methods for preparing dispersions of grafted copolymers disclosed in these patents, the one that is particularly preferred consists in injecting at constant speed, into a reactor containing polyol, simultaneously monomer and initiator dispersed in a fraction of the polyol. According to the abovementioned patents, although numerous initiators may be suitable, it is nevertheless preferable to use azobis(isobutyronitrile) AIBN.

Although AIBN is the preferred initiator for the polymerization, it nevertheless has the drawback of being solid at room temperature and of being very sparingly soluble in the polyol, thus making it necessary for the initiator dispersion to be stirred constantly so that the amount of AIBN injected into the reactor is constant over time. In addition, the decomposition of AIBN during the reaction leads to the formation of side products, such as tetramethylsuccinonitrile, that are highly toxic and whose removal from the copolymer dispersion would be extremely difficult, if not impossible.

Moreover, patent U.S. Pat. No. 4,161,468 describes a process for preparing dispersions of grafted copolymers by in situ polymerization of an ethylenically unsaturated monomer or mixture of monomers in a polyol, in the presence of an asymmetrically substituted liquid azo compound with a half-life at a temperature of between 55 and 100° C. of 10 hours. The liquid azo compound defined in the said document is represented by formula (I):

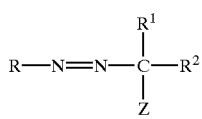

in which R is an alkyl radical with a carbon number of between 1 and 6, $R^1$ is chosen from the group formed by an alkyl radical with a carbon number of between 1 and 20, a phenylalkyl radical containing from 7 to 12 carbon atoms and a cycloalkyl radical containing from 3 to 12 carbon atoms; $R^2$ is an alkyl radical with a carbon number of between 1 and 6 or a phenyl radical; and Z is either a hydrogen atom or a C≡N group.

SUMMARY OF THE INVENTION

The Applicant has now developed a process for preparing stable dispersions of (co)polymers in a polyol by in situ polymerization of an ethylenically unsaturated monomer or mixture of monomers in the presence of a novel family of azo initiator.

This novel family is represented by the azocarboxylic acid esters of formula (II)

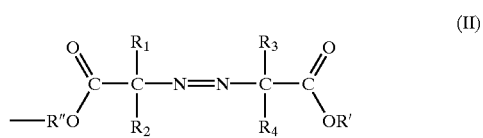

in which:

$R_1$, $R_2$, $R_3$ and $R_4$, which may be identical or different, are independently selected from the group consisting of linear or branched alkyls containing from 1 to 9 carbon atoms and preferably from 1 to 4 carbon atoms, optionally substituted with one or more substituents selected from hydroxyl, $C_1$ to $C_6$ alkoxy and halogen substituents;

$C_3$ to $C_{12}$ cycloalkyls, optionally substituted with one or more substituents selected from $C_1$ to $C_6$ alkyl, $C_1$ to $C_6$ alkoxy, hydroxyl and halo groups;

aralkyls optionally substituted with one or more $C_1$ to $C_6$ alkyl, $C_1$ to $C_6$ alkoxy, hydroxyl and halo groups;

aryls optionally substituted with one or more substituents selected from $C_1$ to $C_6$ alkyl, $C_1$ to $C_6$ alkoxy, hydroxyl and halo groups; with at least one of the combinations $R_1$–$R_2$ and $R_3$–$R_4$ possibly forming an aliphatic ring;

R" and R' are identical or different and are independently selected from the group consisting of linear or branched $C_1$ to $C_{10}$ and preferably $C_1$ to $C_4$ aliphatic radicals.

The advantage of these azocarboxylic acid esters is their low melting point, which is generally less than 27° C. The preferred azocarboxylic acid esters are those in which R" and R' represent methyl or ethyl and in which $R_1$, $R_2$, $R_3$ and $R_4$ advantageously represent $C_1$ to $C_4$ alkyl groups.

The azocarboxylic acid ester that is particularly preferred is diethyl 2,2'-azobisiso-butyrate, that is to say with $R_1$, $R_2$, $R_3$ and $R_4$ representing methyl and R' and R" representing ethyl. A mixture of diethyl 2,2'-azobisisobutyrate (DEAB) and dimethyl 2,2'-azobisisobutyrate (DMAB) with a content by mass of DEAB preferably of greater than 50% gives very advantageous results. Mixtures of DEAB, DMAB and 2-methyl ethyl 2'-azobisisobutyrate, preferably with a COOMe/COOEt molar ratio ≦10, may be suitable.

DETAILED DESCRIPTION OF THE PREFERRED EMBODIMENTS

The azocarboxylic acid esters of formula (II) may be prepared by a conventional two-step process comprising a first step of converting the azonitrile, by reaction with an alcohol, in the presence of HCl, according to the Pinner reaction, leading to the corresponding azo imino ether hydrochloride, and a second step of hydrolysis in the presence of the hydrochloride thus obtained. They may also be prepared by improved processes as described in documents DE 2 254 472, EP 80 275 and EP 230 586.

In addition, these esters may be prepared by reacting an azonitrile with an alcohol and hydrochloric acid in an aromatic solvent, with an HCl/azonitrile molar ratio >2 when the alcohol is methanol and >3 when the alcohol is ethanol or a higher alcohol.

The amount of azocarboxylic acid esters used in the process according to the present invention represents about 0.1% to 6% by weight of the ethylenically unsaturated monomer(s) used, and preferably 0.5% to 4% by weight.

The ethylenically-unsaturated monomers that may be used in the process of the invention are, for example, butadiene, isoprene, 1,4-pentadiene, 1,6-hexadiene, 1,7-octadiene, styrene, α-methylstyrene, 2,4-dimethylstyrene, ethylstyrene, isopropylstyrene, butylstyrene, phenylstyrene, methylstyrene, cyclohexylstyrene, benzylstyrene, etc.; other substituted styrenes, for instance chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinylphenyl phenyl sulphide, p-vinylphenyl phenyl oxide, etc.; acrylic and substituted acrylic monomers, for instance acrylonitrile, acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, ethyl acrylate, 2-ethylhexyl acrylate, phenyl acrylate, phenyl methacrylate, α-chloroacrylonitrile, N,N-dimethylacrylamide, N,N-dibenzylacrylamide, N-butylacrylamide, methacrylylformamide, etc.; vinyl esters, vinyl ethers, vinyl ketones, etc., for instance vinyl acetate, vinyl chloroacetate, vinyl alcohol, vinyl butyrate, isopropenyl acetate, vinyl formate, vinylidene chloride, vinyl methoxyacetate, vinyl benzoate, vinyl chloride, vinyl iodide, vinyltoluene, vinylnaphthalene, vinyl bromide, vinyl fluoride, vinylidene bromide, 1-chloro-1-fluoroethylene, vinylidene fluoride, methyl vinyl ether, ethyl vinyl ether, propyl vinyl ethers, butyl vinyl ethers, 2-ethylhexyl vinyl ether, phenyl vinyl ether, 2-methoxyethyl vinyl ether, methoxybutadiene, 2-butoxyethyl vinyl ether, 3,4-dihydro-1,2-pyran, 2-butoxy-2'-vinyloxyethyl ethyl ether, 2-ethylmercaptoethyl vinyl ether, vinyl methyl ketone, vinyl ethyl ketone, vinyl phosphonates such as bis(β-chloroethyl) vinyl phosphonate, vinyl phenyl ketone, vinyl ethyl sulphide, vinyl ethyl sulphone, N-methyl-N-vinylacetamide, N-vinylpyrrolidone, vinylimidazole, divinyl sulphide, divinyl sulphoxide, divinyl sulphone, sodium vinyl sulphonate, methyl vinyl sulphonate, N-vinylpyrrole, etc.; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinylpyridine, etc. The amount of ethylenically unsaturated monomer(s) for the polymerization is generally from 5% to 80% and preferably from 10% to 50% of the weight of the polyol.

The preferred ethylenically unsaturated monomers are monomers or a mixture of monomers that are miscible in the polyol. Mention may especially be made of styrene and substituted or unsubstituted acrylics.

According to the invention, the polymerization temperature may be between 60 and 140° C. and preferably between 70 and 120° C.

The polyols that may be used in the present invention are known. They may be either free of ethylenic unsaturation, for instance those described in the reexamined U.S. Pat. No. 28,715, or unsaturated, for instance those described in patent U.S. Pat. No. 3,652,652 and the reexamined U.S. Pat. No. 29,014.

Polyols free of ethylenic unsaturation are often obtained by catalytic condensation of an alkylene oxide or a mixture of alkylene oxides simultaneously or successively with an organic compound comprising at least 2 active hydrogen atoms, as mentioned in patents U.S. Pat. No. 1,922,451, U.S. Pat. No. 3,190,927 and U.S. Pat. No. 3,346,557.

Representative polyols are especially polyhydroxylated polyesters, polyalkylenepolyether-polyols, polyurethanes containing several terminal-hydroxyl radicals, polycaprolactonepolyesters containing several terminal hydroxyl radicals, polyhydroxylated phosphorus compounds and adducts of alkylene oxides with polyhydroxylated polythioethers, polyacetals, aliphatic polyols and thiols, ammonia and amines, especially aromatic, aliphatic or heterocyclic amines, optionally as a mixture. The adducts of alkylene oxides with compounds containing two or more of the various radicals of the above classes are also suitable, as is the case for amino alcohols comprising an amino radical and a hydroxyl radical. It is also possible to use the adducts of alkylene oxides with compounds containing a thiol radical and a hydroxyl radical, and likewise with compounds containing an amino radical and a thiol radical. As a general rule, the equivalent weight of the polyols is from 100 to 20 000, preferably from 500 to 10 000 and better still from 1 000 to 3 000.

Any appropriate hydroxylated polyester is suitable, such as, for example, those derived from polycarboxylic acids and from polyhydroxylated alcohols. It is possible to use any suitable polycarboxylic acid, for instance oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethylglutaric acid, α,β-diethylsuccinic acid, isophthalic acid, terephthalic acid, hemimellitic acid and 1,4-cyclohexanedicarboxylic acid. It is possible to use any suitable polyhydroxylated alcohol either of aliphatic nature or of aromatic nature, for instance ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methylglucoside, pentaerythritol and sorbitol. The expression "polyhydroxylated alcohol" also means compounds derived from phenol, for instance 2,2-bis(4-hydroxyphenyl)propane, commonly known as bisphenol A.

It is possible to use any suitable polyalkylene-polyetherpolyol, for instance the product of polymerization of an alkylene oxide or of an alkylene oxide with a polyhydroxylated alcohol containing 2 to 6 hydroxyl radicals. It is possible to use any polyhydroxylated alcohol, such as those mentioned above for the preparation of the hydroxylated polyesters. Any suitable alkylene oxide may be used, as is the case for ethylene oxide, propylene oxide, butylene oxide and amylene oxide, in addition to heterogeneous or block copolymers of these oxides. The polyalkylene-polyetherpolyols may be prepared from other starting compounds such as tetrahydrofuran and copolymers of alkylene oxides with tetrahydrofuran, epihalohydrins, for instance epichlorohydrin, and aralkylene oxides, for instance styrene oxide. The polyalkylene-polyetherpolyols may comprise primary or secondary hydroxyl radicals and are preferably polyethers derived from alkylene oxides of 2 to 6 carbon atoms, such as polyoxyethylene glycols, polyoxypropylene glycols and polyoxybutylene glycols. The polyalkylene-polyetherpolyols may be prepared by any known process, for example that mentioned by Wurtz in 1859 and in Encyclopedia of Chemical Technology, volume 7, pages 257 to 262, published by Interscience Publishers Inc. (1951) or in patent U.S. Pat. No. 1,922,459. The preferred polyethers are especially the adducts of alkylene oxides with trimethylolpropane, glycerol, pentaerythritol, sucrose, sorbitol, propylene glycol and 2,2-(4,4'-hydroxyphenyl) propane, and also mixtures thereof, having an equivalent weight of from 100 to 5 000.

Suitable polyhydroxylated polythioethers which may be condensed with the alkylene oxides are especially the product of condensation of thiodiglycol or the product of reaction of a dihydroxylated alcohol, such as one of those mentioned above for the synthesis of the hydroxylated polyesters, with any other suitable thioether glycol.

The hydroxylated polyester may also be a polyesteramide as obtained by addition of a certain amount of amine or of amino alcohol to the reagents used for the preparation of this polyester. Thus, polyesteramides may be obtained by condensing an amino alcohol such as ethanolamine with the polycarboxylic acids mentioned above, or alternatively they may be prepared with the aid of the same reagents as those forming the hydroxylated polyester, only a portion of the reagents being formed by a diamine such as ethylenediamine.

The polyhydroxylated phosphorus compounds that may be used are especially the compounds mentioned in patent U.S. Pat. No. 3,639,542. The preferred polyhydroxylated phosphorus compounds are obtained from alkylene oxides and from phosphorus acids having a $P_2O_5$ equivalence of about from 72% to 95%.

Suitable polyacetals that may be condensed with alkylene oxides are especially the products of the reaction of formaldehyde or of another suitable aldehyde with a dihydroxylated alcohol or an alkylene oxide, such as those mentioned above.

Suitable aliphatic thiols that may be condensed with alkylene oxides are especially alkanethiols comprising at least two thiol radicals, such as 1,2-ethanedithiol, 1,2-propanedithiol, 1,3-propanedithiol and 1,6-hexanedithiol, and also alkenethiols, for instance 2-butene-1,4-dithiol, and alkynethiols, for instance 3-hexyne-1,6-dithiol.

Suitable amines that-may be condensed with alkylene oxides are especially aromatic amines, for instance aniline, o-chloroaniline, p-aminoaniline, 1,5-diaminonaphthalene, methylenedianiline, the products of condensation of aniline and of formaldehyde and 2,4-diaminotoluene, and also aliphatic amines, for instance methylamine, triisopropanolamine, ethylenediamine, 1,3-propylenediamine, 1,4-butylenediamine and 1,3-butylenediamine.

Polyols containing ester groups may also be suitable. These polyols are prepared by reacting an alkylene oxide with a dicarboxylic acid anhydride and a compound containing active hydrogen atoms. Reference may be made to patents U.S. Pat. No. 3,585,185, U.S. Pat. No. 3,639,541 and U.S. Pat. No. 3,639,542 for a detailed description of the preparation method.

The unsaturated polyols that may be used in the present invention may be prepared by reacting any conventional polyol, such as those defined above, with an organic compound comprising both at least one ethylenic unsaturation and a hydroxyl, carboxyl, epoxide or anhydride radical. As a variant, the polyols may be prepared from a compound comprising both at least one ethylenic unsaturation and a hydroxyl, carboxyl, anhydride or epoxide radical as reagent involved in the synthesis of the polyol. Examples of such organic compounds are unsaturated polycarboxylic acids and anhydrides, for instance maleic acid or anhydride, fumaric acid or anhydride, crotonic acid or anhydride, propenylsuccinic anhydride and halogenated maleic acids or anhydrides, unsaturated polyhydroxylated alcohols, for instance 2-butene-1,4-diol, allyl glyceryl ether, allyl trimethylolpropane ether, allyl pentaerythrityl ether, vinyl pentaerythrityl ether, diallyl pentaerythrityl ether and 1-butene-3,4-diol, and also unsaturated epoxides, for instance 1-vinylcyclohexane 3,4-epoxide, butadiene monoxide, vinyl glycidyl ether or 1-vinyloxy-2,3-epoxypropane, glycidyl methacrylate and 3-allyloxypropylene oxide or allyl glycidyl ether. When a polycarboxylic acid or anhydride is used to incorporate an unsaturation into the polyols, it is necessary to react the unsaturated polyol with an alkylene oxide, which is preferably ethylene oxide or propylene oxide, to replace the carboxyl radicals with hydroxyl radicals before the use in accordance with the invention. The amount of alkylene oxide used is of a nature to lower the acid number of the unsaturated polyol to not more than about 1.

For the preparation of unsaturated polyols that may be used in the process according to the invention, the amount of organic compound, relative to 1 mol of polyol, is from about 0.1 to 3.0 mol and preferably from 0.30 to 1.5 mol.

The preparation of unsaturated polyols used according to the invention is carried out according to the conventional processes, such as those described in patents U.S. Pat. No. 3,275,606 and U.S. Pat. No. 3,280,077. As a general rule, it is necessary for the reaction temperature to be from 0 to 130° C. Either acid catalysts, for instance Lewis acids, or basic catalysts, for instance alkali metal hydroxides, may be suitable. Furthermore, a catalyst-free reaction may be carried out at a temperature of from 50 to 200° C.

In addition, the unsaturated polyols obtained by the free-radical polymerization of dienes may be suitable. Mention may especially be made of the polyols prepared by polymerizing polybutadiene or isoprene with, optionally, one or more ethylenically unsaturated monomer(s) with a free-radial initiator such as, for example, hydrogen peroxide.

The process of the invention may be carried out in the presence of a chain-transfer agent, especially alkyl mercaptans with the alkyl radical containing from 1 to 20 carbon atoms. The amount of chain-transfer agent used is generally between 0% and 2% by weight of the ethylenically unsaturated monomer(s) to be polymerized.

The process in accordance with the invention may be carried out by introducing all the reagents into a reactor, which is then brought to the polymerization temperature. The process may also be carried out by simultaneously supplying the ethylenically unsaturated monomer(s) and the liquid azocarboxylic acid ester to the polyol at constant speed. According to one preferred mode of the process, the reactor containing the polyol is first placed under nitrogen, and then brought to the polymerization temperature, after which the ethylenically unsaturated monomer(s), optionally as a mixture with the chain-transfer agent, and the azocarboxylic acid ester, optionally dissolved in a fraction of the polyol, are introduced simultaneously and at constant speed. After the end of the introduction of the monomer(s), the reactor is brought to the curing temperature with injection of a fraction of azocarboxylic acid ester so as to consume the residual monomers. Throughout the operations, the reactor is flushed with nitrogen.

According to one variant of the process, the azocarboxylic acid ester may be introduced semi-continuously throughout the polymerization.

In addition to the advantage of being liquid at a temperature of between −20 and 27° C., the carboxylic acid esters used are extremely soluble in polyols and other organic media. Furthermore, they do not generate either toxic side products or even cyano compounds.

The copolymer dispersions thus obtained are stable, transparent and able to be used in the manufacture of polyurethanes.

EXPERIMENTAL SECTION

| Products: | |
|---|---|
| DEAB: | diethyl 2,2'-azobisisobutyrate |
| Arcol 1 000 P: | polyoxypropylene polyol from Lyondell containing 0.02 meq/g of unsaturation, with an OH number of 110 mg KOH/g |
| Arcol polyol 1025: | polyoxypropylene polyol from Lyondell containing 50 meq/kg of unsaturation, with an OH number of 28.5 mg KOH/g |
| PolyBd R20LM: | hydroxylated polybutadiene from Elf Atochem, with an OH number of 95 mg KOH/g |
| PolyBd R45HT: | hydroxylated polybutadiene from Elf Atochem, with an OH number of 47 mg KOH/g |

In the text hereinbelow, except where otherwise indicated, the amounts are expressed as parts by weight.

EXAMPLE 1

60 parts of Arcol 1 000 P are introduced into a reactor equipped with a thermometer, a stirrer and a source of nitrogen. The polyol is degassed with nitrogen for 30 minutes by sparging and is then maintained under a nitrogen atmosphere throughout the reaction. The contents of the reactor are then brought to 80° C. A mixture consisting of 10 parts of styrene, 10 parts of acrylonitrile and 0.04 part of n-dodecyl mercaptan is introduced into the reactor over a period of 3 hours in parallel with a solution of 20 parts of Arcol 1 000 P to which is added 0.3 part of DEAB. At the end of the addition of the monomers, the polyol and the initiator, 0.04 part of DEAB is added to the reactor, the temperature of the reaction medium is then raised to 100° C. and the medium is maintained at this temperature for one hour. The contents of the reactor are then cooled and finally discharged.

The composition thus obtained is a dispersion with a Brookfield viscosity at 25° C. of 1 080 mPa.s and an OH number: 85 mg KOH/g.

EXAMPLE 2

The process is performed as described in Example 1, except that the Arcol 1 000 P is replaced with PolyBd R20LM.

The composition thus obtained is a transparent homogeneous dispersion with a Brookfield viscosity at 25° C. of 3 050 mPa.s and an OH number: 75 mg KOH/g.

EXAMPLE 3

60 parts of PolyBd R45HT are introduced into a reactor equipped with a thermometer, a stirrer and a source of nitrogen. The polyol is degassed with nitrogen for 30 minutes by sparing and is then maintained under a nitrogen atmosphere throughout the reaction. The contents of the reactor are then brought to 80° C. A mixture consisting of 10 parts of styrene, 10 parts of acrylonitrile and 0.04 part of n-dodecyl mercaptan is introduced into the reactor over a period of 3 hours in parallel with a solution of 20 parts of PolyBd R20LM to which is added 0.4 part of DEAB. At the end of the addition of the monomers, the polyol ant the initiator, 0.08 part of DEAB is added to the reactor, the temperature of the reaction medium is raised to 100° C. and the medium is maintained at this temperature for one hour. The contents of the reactor are then cooled and discharged.

The composition thus obtained is a transparent homogeneous dispersion with a Brookfield viscosity at 25° C. of 8 000 mPa.s and an OH number: 46 mg KOH/g.

EXAMPLE 4

The process is performed as described in Example 2, except that a mixture consisting of 20 parts of butyl methacrylate and 0.04 part of n-dodecyl mercaptan is introduced into the reactor over a period of 3 hours in parallel with a solution of 20 parts of PolyBd R20LM to which is added 0.4 part of DEAB.

The composition thus obtained is a transparent homogeneous dispersion with a Brookfield viscosity at 25° C. of 7 300 mPa.s and an OH number: 75 mg KOH/g.

EXAMPLE 5

The process is performed as described in Example 1, except that the Arcol 1 000 P is replaced with Arcol polyol 1 025 and that the mixture consisting of 6 parts of styrene and 14 parts of acrylonitrile is introduced into the reactor over a period of three hours in parallel with a solution of 20 parts of Arcol polyol 1 025 to which is added 0.4 part of DEAB.

The composition thus obtained is a stable dispersion with a Brookfield viscosity at 25° C. of 3 850 mpa.s and an OH number=23 mg KOH/g.

What is claimed is:

1. A process for preparing stable dispersions of (co) polymers in a polyol by in situ polymerization of an ethylenically unsaturated monomer or mixture of monomers in the presence of an initiator comprising an azocarboxylic acid ester of formula (II) or a mixture of azocarboxylic acid esters of formula (II)

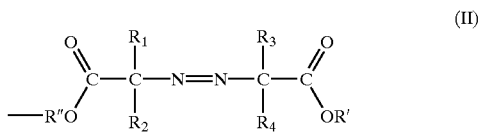

wherein $R_1$, $R_2$, $R_3$ and $R_4$, which may be identical or different, are independently selected from the group consisting of

- linear or branched alkyls comprising from 1 to 9 carbon atoms optionally substituted with one or more substituents selected from hydroxyl, $C_1$ to $C_6$ alkoxy and halogen substituents;
- $C_3$ to $C_{12}$ cycloalkyls, optionally substituted with one or more substituents selected from $C_1$ to $C_6$ alkyl, $C_1$ to $C_6$ alkoxy, hydroxyl and halo groups;
- aralkyls optionally substituted with one or more $C_1$ to $C_6$ alkyl, $C_1$ to $C_6$ alkoxy, hydroxyl and halo groups;

aryls optionally substituted with one or more substituents selected from $C_1$ to $C_6$ alkyl, $C_1$ to $C_6$ alkoxy, hydroxyl and halo groups;

with at least one of the combinations $R_1$–$R_2$ and $R_3$–$R_4$ possibly forming an aliphatic ring; R" and R' are identical or different and are independently selected from the group consisting of linear or branched $C_1$ to $C_{10}$ aliphatic radicals.

2. Process according to claim 1, wherein the azocarboxylic acid esters are those in which R" and R' represent methyl or ethyl and in which $R_1$, $R_2$, $R_3$ and $R_4$ represent a $C_1$ to $C_4$ alkyl radical.

3. Process according to claim 2, wherein R" and R' represent an ethyl radical and $R_1$, $R_2$, $R_3$ and $R_4$ represent a methyl radical.

4. Process according to claim 1, wherein the initiator is a mixture of diethyl 2,2'-azobisisobutyrate and 2-methyl ethyl 2'-azobisisobutyrate.

5. Process according to claim 1, wherein the ethylenically unsaturated monomers are monomers or mixtures of monomers that are miscible in the polyol.

6. Process according to claim 1, wherein the initiator is a mixture of diethyl 2,2'-azobisisobutyrate, dimethyl 2,2'-azobisisobutyrate and 2-methyl ethyl 2'-azobisisobutyrate.

7. Process according to claim 1, comprising introducing the initiator semi-continuously.

8. Process according to claim 1, wherein $R_1$, $R_2$, $R_3$ and $R_4$, which may be identical or different, are linear or branched alkyls comprising from 1 to 4 carbon atoms.

9. Process according to claim 1, at least one of the combinations $R_1$–$R_2$ and $R_3$–$R_4$ possibly forming an aliphatic ring; R" and R' are identical or different and are independently selected from the group consisting of linear or branched $C_1$ to $C_4$ aliphatic radicals.

* * * * *